3,479,135
PRODUCTION OF HIGH PURITY MgCl₂ FROM SPENT HCl PICKLE LIQUOR
Ralph E. Pray, Hammond, and Norman T. Mills, Highland, Ind., assignors to Inland Steel Company, Chicago, Ill., a corporation of Delaware
No Drawing. Filed June 9, 1967, Ser. No. 644,829
Int. Cl. C01f 5/30
U.S. Cl. 23—91          6 Claims

ABSTRACT OF THE DISCLOSURE

A method for producing solutions of magnesium chloride which are essentially iron free, by treating spent hydrochloric acid pickle liquor with a stoichiometric excess of magnesium oxide, removing the solids, treating the remaining liquid with more magnesium oxide, and recovering a pure magnesium chloride solution.

---

This invention relates generally to a method of recovering iron values from spent hydrochloric acid pickle liquor and at the same time recovering high-purity magnesium chloride, free from any substantial amounts of iron contamination. More particularly, this invention relates to a method of producing high purity magnesium chloride (which is suitable for use in preparing magnesium metal by electrolysis) e.g. the $MgCl_2$ contains not more than about 0.001 percent iron.

The process of pickling is a process of chemically removing oxides and scale from the surface of metals by the action of water solutions of inorganic acids. The reaction occurring when steel or iron materials are immersed in dilute inorganic acid solutions includes the solution of metal as the salt of the acid and the evolution of hydrogen. Steel pickled in dilute hydrochloric acid solutions is an example of such a reaction, with the end products of the reaction including aqueous solution of iron chlorides. Adherent films of oxide are undermined by the acid attack through the pervious scale on the base metal. FeO is not dissolved as readily as the steel, but does have higher reaction rates than $Fe_2O_3$, and $Fe_3O_4$, both of the latter being soluble very slowly in the acid. Ferric chloride is formed first, and then reduced to ferrous chloride by free hydrogen. Typically, steels are pickled by a bath containing approximately 15 percent hydrochloric acid at 160° F. As originally made up, the acid solutions used for pickling can run from 5 percent hydrochloric acid up to 15 percent or higher. These are usually worked until the acid content approaches 1 percent, by which time the pickling solution may contain up to ½ pound of iron per gallon.

The disposal of spent pickle liquor from the iron and steel industries has long posed problems, not only with regard to the loss of metal and elemental chemical values present therein, but also because of contamination and pollution of water into which such spent pickle liquor is dumped. Typically, such a spent waste liquor contains approximately between about 0.5 and 2 percent hydrochloric acid and can contain between 100 and 150 grams of iron per liter. However, the acid concentration can run as high as 5 or 6 percent on occasion. Dumping such acid bearing wastes into lakes and streams aggravates the pollution problem.

The electrolytic process for producing magnesium metal requires magnesium chloride essentially free from contaminants. Iron in particular is a troublesome contaminant, and in order to produce a suitable high-grade magnesium by the electrolytic technique, it is required that the iron content be well under 0.01 percent and preferably in the vicinity of 0.001 percent or less by weight, on a dry basis.

It is elementary inorganic chemistry that magnesium oxide, such as that found in soft-burned magnesite, or various forms of magnesium hydroxide, will react with hydrochloric acid to form magnesium chloride. It further is known that magnesium from magnesium oxide will replace iron from various iron chloride solutions to form magnesium chloride. Such reactions have been suggested heretofore, but so far have been unsatisfactory in that the resulting magnesium chloride is contaminated with so much iron that it was not feasible to use it in the commercial electrolytic production of magnesium. It has been found that the iron contamination of the magnesium chloride persists even though increasing amounts of magnesium oxide including stoichiometric quantities of up to 200 percent of theoretical, based on the iron content of the pickle liquor, have been used.

This invention is based on the discovery that these problems can be obviated by the use of a two-step reaction to neutralize the remaining acid, precipitate the iron values, and yield a magnesium chloride solution which is essentially iron free. Essentially, this process may be carried out by a first step of adding finely divided magnesium oxide, such as that which is present in soft burned magnesite, to the pickle liquor in a quantity slightly in excess of the theoretical, i.e. from about 105 percent to about 115 percent of stoichiometric requirements based upon the iron content of the pickle liquor. The magesium oxide is allowed to react with the spent pickle liquor at which time a precipitate of iron hydroxides is formed. The precipitate is then separated from the solution by any convenient method. The second step comprises a further addition of magnesium oxide, in an amount equal to form about 2 percent to about 10 percent of the original theoretical requirement, to the solution remaining from the first step. The reaction of the second step results in a second precipitation of iron hydroxides, which are removed to yield a high-purity magnesium chloride solution.

This invention results in a magnesium chloride solution which is much lower in iron content than could be achieved by a single-stage reaction using much more magnesium oxide. Thus there is an increase, not only in the purity of the desired product, but in the economy of the overall reaction since far less magnesium oxide is required.

It is essential to the success of this invention to use a stoichiometric excess of magnesium oxide with respect to the requirements to precipitate the iron as ferrous hydroxide, especially during the first stage. It is postulated that the excess magnesium oxide causes the reaction mixture to assume an alkaline pH which results in a quick bulky precipitation of the iron hydroxides in a physical form adapted to filtration.

The quantity of magnesium oxide used during the second stage may vary over some limits, but generally about 5 percent based on the original requirements has been found to be sufficient, and any additional magnesium oxide does not substantially increase the efficiency of the final precipitation of the iron, but only increases the expense of the operation. Under some circumstances, however, the presence of additional excess of magnesium oxide may serve to increase the filterability of the iron hydroxides which result.

It is desirable that the reaction be carried out at temperatures exceeding room temperature. It has been found that temperatures of from 140° F. through 200° F. are operable, but that temperatures in the vicinity of 150° through 160° F. are most desirable. Although lower temperatures may be used, the reaction rate is lower. Since the spent pickle liquor typically comes off the line at about 160° F., it has been found that the process of this invention may be conveniently carried out at about or a little below that temperature. Additionally, it has been observed that the reaction by which magnesium oxide dissolves in the spent pickle liquor is exothermic at about this temperature. Furthermore, in the interest of rapid reaction kinetics, it is preferable to use MgO of a reactive nature in a finely divided state.

Magnesium oxide (MgO) is only slightly soluble in water. For example, the solubility is 0.016 gram per liter in 16° C. water, and decreases with increasing temperature to become essentially insoluble in 100° C. water. However, in the presence of an electrolyte such as aqueous $FeCl_2$, the solubility of MgO increases significantly. Also, magnesium chloride ($MgCl_2$) has a solubility of 542.5 grams per liter at 20° C., and 727 grams per liter at 100° C. in water.

Likewise, the iron chlorides are highly soluble in both hot and cold water. For instance, the solubility of ferrous chloride ($FeCl_2$) in water is 644 grams per liter at 10° C. and 1057 grams per liter at 100° C. The iron hydroxides are essentially insoluble.

Magnesite is principally composed of magnesium carbonate ($MgCO_3$) having a specific gravity of 2.95–3.2. Magnesite is the preferred source of magnesium oxide for use in the process of this invention, since it is readily obtainable and can be easily soft-burned to yield magnesium oxide. Magnesium carbonate decomposes at about 330° C. with the evolution of carbon dioxide. It is important that the magnesium oxide be in a reactive form, such as that produced by the soft-burning of magnesite. For example, magnesite burned at high temperatures (hard burned) forms periclase which is a nonreactive form of magnesium oxide, not practically suitable for use in this invention. Other minerals such as dolomite which contain or which can be treated to yield reactive forms of magnesium oxide may be used as the raw materials for this process.

The following example illustrates the process of this invention, and various modifications to the basic process which may be used. It is intended to represent the best mode contemplated for carrying out the invention.

EXAMPLE I

A spent pickle liquor containing about one percent hydrochloric acid and 90.4 grams per liter of iron was treated as follows:

A 50 milliliter aliquot was heated to 160° F. and to this was added 3.553 grams of magnesium oxide (110 percent of stoichiometric requirement). This was reacted using BB shot as a mixing agent for 3 minutes and filtered. The resulting iron hydroxide was washed with a small amount of water. The filtrate was heated to 150° F. and then 0.1615 gram of magnesium oxide (5 percent of original stoichiometric requirement) was added thereto. This was reacted for two minutes and filtered twice through two thicknesses of filter paper. The first filtrate was yellow; the second filtrate was clear, but took on a faint yellow color after standing for several minutes. Both filtrates were dried and analyzed using an emission spectrograph and showed as follows:

|  | Iron, percent | Tin, percent |
|---|---|---|
| First Filtrate | 0.10 | 0.001 |
| Second Filtrate | 0.001 | 0.0001 |

The equipment in which the above-described reactions are carried out forms no essential part of the invention. Although the example set forth above illustrates a batch-type process, this invention also contemplates the use of the process in a continuous manner, if found desirable.

The separation of the iron hydroxide precipitates from the solutions can be done in any convenient manner, such as centrifuging or filtering. The conditions under which the removal takes place may be varied over wide limits. Various filter-aid materials may be added to either the first reaction product or to the second reaction product, or both in order to speed up the filtration.

For purposes of this patent application, the term "stoichiometric excess" shall mean a quantity which exceeds 100 percent of the theoretical chemical requirements. In all cases the stoichiometric requirement is determined by the amount of iron initially present in the spent pickle liquor, and is computed for the following reaction:

$$FeCl_2 + MgO + H_2O \rightarrow Fe(OH)_2\downarrow + MgCl_2$$

Although this invention has been herein described in detail and illustrated by example, it is to be understood that the example is for purposes of illustration only and that the invention is not limited thereto, reference being had to the appended claims for a definition of the scope of the invention.

What is claimed is:

1. A process of preparing a magnesium chloride solution from spent hydrochloric acid pickle liquor, wherein the magnesium chloride solution contains not more than about 0.001 percent iron based on the amount of magnesium present, which comprises reacting spent hydrochloric acid pickle liquor with a first amount of magnesium oxide, said first amount being from about 105% to about 115% of the stoichiometric requirement of magnesium oxide, separating the resulting solid iron hydroxides from the resulting solution, reacting said resulting solution at a temperature between about 140° F. and 200° F. in the absence of added air with a second amount of magnesium oxide, said second amount being from about 2% to about 10% of the original stoichiometric requirement of magnesium oxide, separating the resulting solid iron hydroxides from the second resulting solution and recovering a solution of purified magnesium chloride containing not more than about 0.001 percent iron, based on the magnesium present.

2. A process as described in claim 1, wherein said reactions are carried out at from about 140° F. to about 200° F.

3. A process as described in claim 1, wherein soft burned magnesite is the source of magnesium oxide for both reactions.

4. A process as described in claim 1, wherein the magnesium oxide is finely divided.

5. A process as described in claim 1, wherein the solid iron hydroxides is recovered by filtration after the first reaction.

6. A process as described in claim 1, wherein the solid iron hydroxides is recovered by filtration after the second reaction.

References Cited

UNITED STATES PATENTS

| 663,840 | 12/1900 | Zitt | 23—201 |
| 1,238,147 | 8/1917 | Jesser | 23—201 |
| 2,423,385 | 7/1947 | Hixson et al. | 23—154 XR |
| 2,898,194 | 8/1959 | Eells et al. | 23—201 |

EDWARD STERN, Primary Examiner

U.S. Cl. X.R.

23—200